US010110280B2

(12) United States Patent
Nakano

(10) Patent No.: US 10,110,280 B2
(45) Date of Patent: Oct. 23, 2018

(54) ELECTRONIC DEVICE WIRELESSLY COMMUNICATING WITH EXTERNAL DEVICE

(71) Applicant: CANON KABUSHIKI KAISHA, Tokyo (JP)

(72) Inventor: Katsuya Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 15/333,909

(22) Filed: Oct. 25, 2016

(65) Prior Publication Data

US 2017/0127224 A1 May 4, 2017

(30) Foreign Application Priority Data

Oct. 29, 2015 (JP) .................................. 2015-213183

(51) Int. Cl.
*H04B 5/00* (2006.01)
*H04W 4/80* (2018.01)
*H04W 84/12* (2009.01)

(52) U.S. Cl.
CPC ......... *H04B 5/0037* (2013.01); *H04B 5/0031* (2013.01); *H04W 4/80* (2018.02); *H04W 84/12* (2013.01)

(58) Field of Classification Search
USPC ....................................................... 455/41.2
See application file for complete search history.

(56) References Cited

U.S. PATENT DOCUMENTS

| 2013/0140906 | A1* | 6/2013 | Tanabe | H02J 17/00 307/104 |
| 2013/0241474 | A1* | 9/2013 | Moshfeghi | H02J 7/0027 320/108 |
| 2015/0097445 | A1* | 4/2015 | Tsukamoto | H04B 5/0037 307/104 |
| 2016/0049825 | A1* | 2/2016 | Green | H02J 7/025 320/108 |
| 2016/0352874 | A1* | 12/2016 | Lawrenson | G06F 1/1666 |

FOREIGN PATENT DOCUMENTS

JP   2008113519 A   5/2008

* cited by examiner

*Primary Examiner* — Ganiyu A Hanidu
(74) *Attorney, Agent, or Firm* — Canon U.S.A., Inc. IP Division

(57) ABSTRACT

An electronic device includes a proximity wireless communication unit configured to communicate with an external device through proximity wireless communication using power wirelessly received from the external device, a storage unit configured to be accessed by the external device via the proximity wireless communication unit, a control unit configured to control execution of a plurality of application processes, and a power source. In various embodiments, according to a condition of the power source, the control unit controls to store information for executing an application process related to charging of the power source in the storage unit, the application process being one among the plurality of application processes.

11 Claims, 10 Drawing Sheets

ELECTRONIC DEVICE WIRELESSLY COMMUNICATING WITH EXTERNAL DEVICE

BACKGROUND OF THE INVENTION

Field of the Invention

The present invention relates to an electronic device that wirelessly communicates with an external device.

Description of the Related Art

A near field communication system that performs wireless communication in a short distance without connecting via a connector is known. In such a near field communication system, there is a known wireless communication device that performs, via a same antenna, both data communication for transmitting a command to an electronic device and power transmission to the electronic device (see Japanese Patent Laid-Open No. 2008-113519).

In such a near field communication system, when more than one communication application for near field communication is executable, an initiator side of the near field communication can arbitrarily determine which communication application to start. In some situations, this can cause problems. For example, in a situation where a remaining battery capacity of a device in a target side of the near field communication is low, when execution of a communication application is started without executing a wireless power supply application, there can be a problem that the remaining battery capacity of the device on the target side can become too low during the execution of the communication application.

SUMMARY OF THE INVENTION

In various embodiments of the present application, an electronic device includes a proximity wireless communication unit configured to communicate with an external device through proximity wireless communication using power wirelessly received from the external device. The electronic device also includes a storage unit configured to be accessed by the external device via the proximity wireless communication unit, a control unit configured to control execution of a plurality of application processes, and a power source. According to the power source's condition, the control unit controls to store information for executing an application process related to charging of the power source in the storage unit, the application process being one among the plurality of application processes for which the control unit controls execution.

Further features of the present invention will become apparent from the following description of exemplary embodiments (with reference to the attached drawings).

DESCRIPTION OF THE EMBODIMENTS

[First Embodiment]

Hereinafter, a first embodiment of the present invention will be explained in detail with reference to the drawings.

Figure 1:
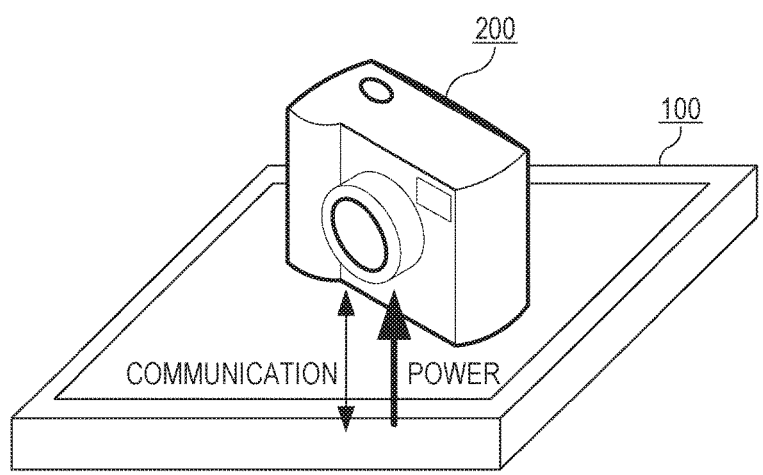
FIG. 1 is diagram for explaining an outline of a near field communication system according to one embodiment.

As illustrated in FIG. 1, a near field communication system according to the first embodiment includes a power supply apparatus 100 and an electronic device 200, which are wireless communication devices. In a communication system according to the first embodiment, when a distance between the power supply apparatus 100 and the electronic device 200 is within a predetermined range, the power supply apparatus 100 wirelessly supplies power to the electronic device 200.

Further, when the electronic device 200 is located within the predetermined range from the power supply apparatus 100, the electronic device 200 can wirelessly receive power output from the power supply apparatus 100. However, when the electronic device 200 is not located within the predetermined distance from the power supply apparatus 100, the electronic device 200 cannot receive power from the power supply apparatus 100. Here, the predetermined range is assumed to be a range that the power supply apparatus 100 can communicate with the electronic device 200. Here, according to the first embodiment, the predetermined range is a range on the housing of the power supply apparatus 100; however, this does not set any limitation. Further, the power supply apparatus 100 may wirelessly supply power to a plurality of electronic devices.

On the other hand, the electronic device 200 may be an image capture apparatus of a camera or the like or a reproducing apparatus that reproduces sound data, image data, or the like. Further, the electronic device 200 may be a communication device such as a mobile phone and a smartphone. Further, the electronic device 200 may be a battery pack including a battery. Further, the electronic device 200 may be a device like a vehicle that is driven by the power supplied from the power supply apparatus 100. Further, the electronic device 200 may be a device for receiving television broadcast, a display for displaying image data, or a personal computer. Further, the electronic device 200 may be a device that operates with the power supplied from the power supply apparatus 100 even when a battery is not attached.

Figure 2:
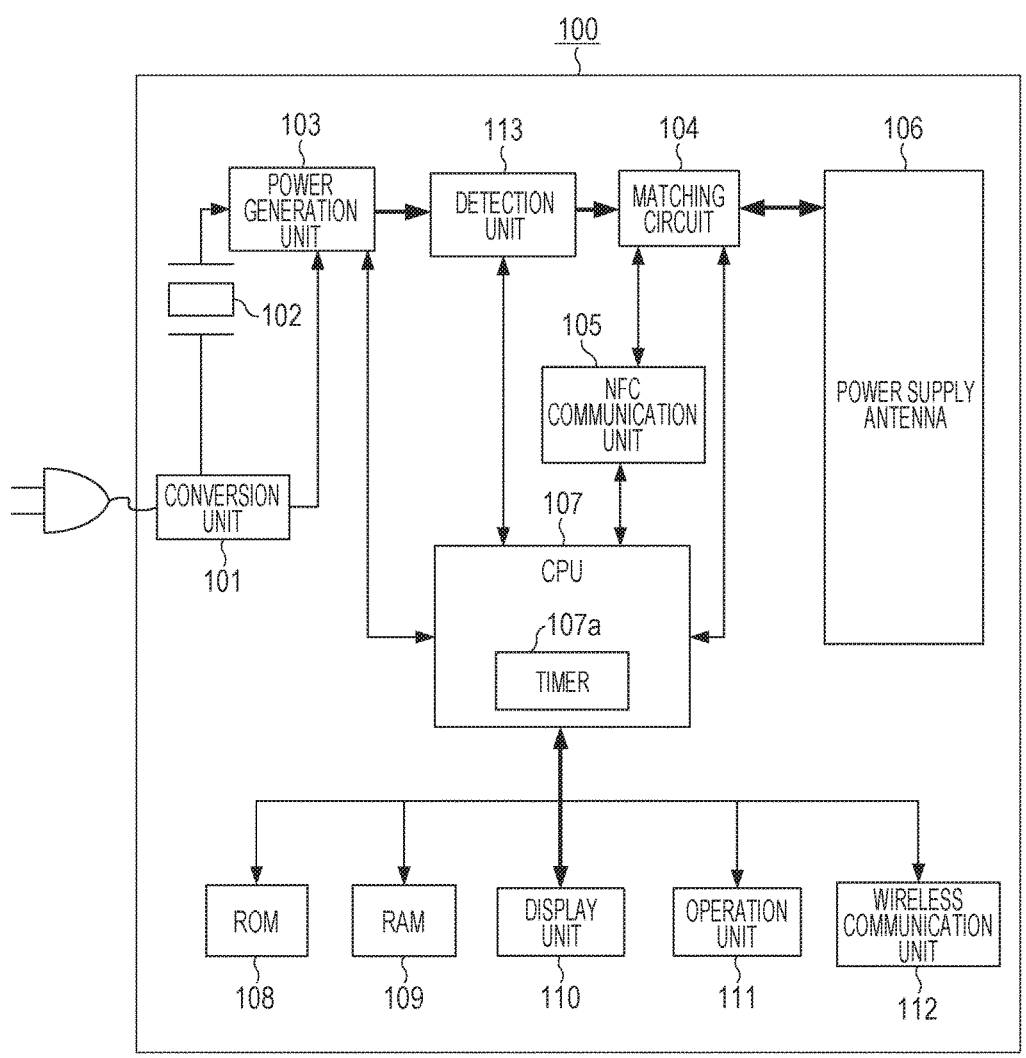
FIG. 2 is a block diagram for explaining an example of configuration components included in a power supply apparatus according to one embodiment.

FIG. 2 is a block diagram for explaining an example of components included in the power supply apparatus 100. As illustrated in FIG. 2, the power supply apparatus 100 includes a conversion unit 101, an oscillator 102, a power generation unit 103, a matching circuit 104, an NFC communication unit 105, a power supply antenna 106, and a central processing unit (CPU) 107. Further, the power supply apparatus 100 includes a ROM 108, a RAM 109, a display unit 110, an operation unit 111, a wireless communication unit 112, and a detection unit 113.

When an unillustrated AC power source and the power supply apparatus 100 are connected, the conversion unit 101 converts alternating-current power supplied from the unillustrated AC power source into direct-current power and supplies the converted direct-current power to the entire power supply apparatus 100.

The oscillator 102 is driven by the power supplied from the AC power source via the conversion unit 101 and oscillates a frequency used for the power supply. Here, the oscillator 102 uses a crystal oscillator or the like.

The power generation unit 103 generates power to be supplied to the electronic device 200 via the power supply antenna 106, based on the power supplied from the conversion unit 101 and the frequency oscillated by the oscillator 102. The power generation unit 103 internally includes a field effect transistor (FET) or the like and generates power to be output to the electronic device 200 according to the frequency oscillated by the oscillator 102. Here, the power generated by the power generation unit 103 is supplied to the matching circuit 104 via the detection unit 113.

Further, the power generated by the power generation unit 103 includes communication power and supplying power. The power supply apparatus 100 performs power supply between the power supply apparatus 100 and the electronic device 200 according to NFC (Near Field Communication) standard. The communication power is power supplied from the power supply apparatus 100 to the electronic device 200 to perform wireless communication based on the NFC standard (NFCIP-1(ISO/IEC 18092) or NFCIP-2(ISO/IEC 21481)). On the other hand, the supplying power is power supplied from the power supply apparatus 100 to the electronic device 200 so that the electronic device 200 charges a battery. The communication power is, for example, power equal to or lower than 1 W and the supplying power is for example power equal to or greater than 2 W.

Here, the communication power is power lower than the supplying power. Further, the communication power is not limited to the power equal to or lower than 1 W as long as it is the power used by the power supply apparatus 100 to perform wireless communication based on the NFC standard. Further, the supplying power is not limited to the power equal to or greater than 2 W as long as it is the power used by the power supply apparatus 100 to make the electronic device 200 charge the battery.

Figure 4:
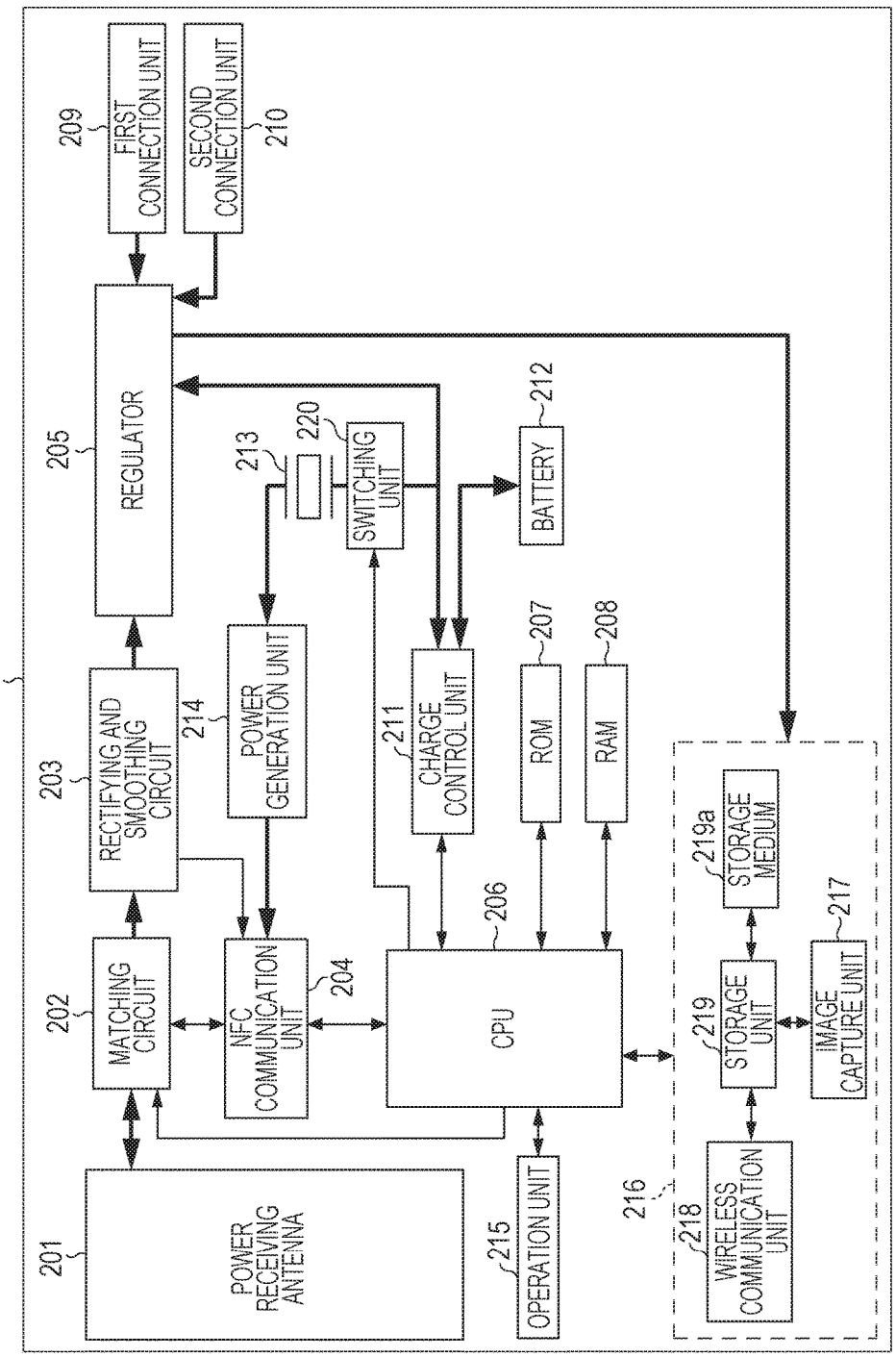
FIG. 4 is a block diagram for explaining an example of configuration components included in an electronic device according to one embodiment.

The matching circuit 104 is a resonant circuit that resonates between the power supply antenna 106 and a power receiving antenna 201 of the electronic device 200 illustrated in FIG. 4. Further, the matching circuit 104 includes a circuit that performs impedance matching between the power generation unit 103 and the power supply antenna 106. In the matching circuit 104, an unillustrated coil or an unillustrated capacitor is included.

When the power supply apparatus 100 outputs one of the communication power and supplying power, the CPU 107 controls to make the resonance frequency f of the power supply antenna 106 be a predetermined frequency so as to resonate between the power supply antenna 106 and the power receiving antenna 201 of the electronic device 200. In this case, the CPU 107 changes the resonance frequency f of the power supply antenna 106 by controlling a value of inductance included in the matching circuit 104 and a value of capacitance included in the matching circuit 104. Here, the predetermined frequency is a frequency used to perform wireless communication based on the NFC standard between the power supply apparatus 100 and the electronic device 200. Further, the predetermined frequency is a frequency used to resonate between the power supply apparatus 100 and the electronic device 200. The predetermined frequency is, for example, a frequency of 13.56 MHz.

Further, the matching circuit 104 can detect electric current that flows in the power supply antenna 106 and detect a voltage supplied to the power supply antenna 106. The matching circuit 104 informs a value of the detected electric current of the power supply antenna 106 to the CPU 107 and informs a value of the detected voltage of the power supply antenna 106 to the CPU 107. Further, the matching circuit 104 informs the value of the detected electric current of the power supply antenna 106 to the NFC communication unit 105.

When the resonance frequency f of the power supply antenna 106 is 13.56 MHz, the NFC communication unit 105 performs wireless communication based on the NFC standard. When the resonance frequency f of the power supply antenna 106 is 13.56 MHz and the power supply apparatus 100 supplies communication power to electronic device 200, the NFC communication unit 105 can perform wireless communication based on the NFC standard with the electronic device 200 via the power supply antenna 106. On the other hand, when the frequency oscillated by the oscillator 102 is 13.56 MHz and the power supply apparatus 100 supplies supplying power to the electronic device 200, the NFC communication unit 105 cannot perform wireless communication based on the NFC standard with the electronic device 200 via the power supply antenna 106.

The NFC communication unit 105 superimposes a command on the communication power and transmits the command to the electronic device 200 via the power supply antenna 106. In this case, to generate a pulse signal corresponding to a command transmitted to the electronic device 200, the NFC communication unit 105 performs an ASK (amplitude shift keying) modulation on the communication power generated in the power generation unit 103 based on a protocol of the NFC standard. Here, the ASK modulation is modulation using an amplitude displacement and is used in communication between an integrated circuit card and a card reader. After that, the NFC communication unit 105 transmits the generated pulse signal, as a command, to the electronic device 200 via the power supply antenna 106.

The electronic device 200 obtains bit data including information of "1" and information of "0" by analyzing the pulse signal received from the power supply apparatus 100 and performs a process indicated by the bit data. When the electronic device 200 receives a command from the power supply apparatus 100, the electronic device 200 transmits response data corresponding to the received command to the power supply apparatus 100 by modulating load included in the electronic device 200. When the electronic device 200 modulates the load, the electric current flowing in the power supply antenna 106 changes. Thus, the NFC communication unit 105 can receive the response data from the electronic device 200 by demodulating, in an unillustrated demodulation circuit included in the NFC communication unit 105, the value of the electric current of the power supply antenna 106 supplied from the matching circuit 104.

The power supply antenna 106 is an antenna for outputting to outside the power generated by the power generation unit 103. The power supply apparatus 100 supplies the power to the electronic device 200 via the power supply antenna 106 or transmits a command to the electronic device 200 via the power supply antenna 106. Further, the power supply apparatus 100 receives, from the electronic device 200 via the power supply antenna 106, a command and response data corresponding to a command transmitted to the electronic device 200.

The CPU 107 controls the power supply apparatus 100 by executing a computer program stored in the ROM 108. Further, the CPU 107 controls the power supplied to the electronic device 200 by controlling the power generation unit 103. Further, the CPU 107 includes a timer 107a that measures time elapsed after the communication power is output.

The ROM 108 stores the computer program for controlling the power supply apparatus 100 and information such as a parameter of the power supply apparatus 100.

The RAM 109 is a rewritable memory and stores a computer program for controlling the power supply apparatus 100, information such as a parameter of the power supply apparatus 100, and data from the electronic device 200 received by the NFC communication unit 105.

The display unit 110 displays image data supplied from one of the RAM 109 and the ROM 108. Further, the display unit 110 performs a notification display for a user.

The operation unit 111 provides a user interface for operating the power supply apparatus 100. The operation unit 111 includes a power button of the power supply apparatus 100, a mode switch button of the power supply apparatus 100, and the like and the buttons are composed of a switch, a touch panel, and the like. The CPU 107 controls the power supply apparatus 100 according to an input signal input via the operation unit 111.

The wireless communication unit 112 performs wireless communication which is different from the wireless communication based on the NFC standard. The wireless communication unit 112 is assumed to perform wireless communication with a longer communication distance compared to the wireless communication based on the NFC standard and perform wireless communication using a frequency band which is different from that of the wireless communication based on the NFC standard. For example, the wireless communication unit 112 is assumed to perform wireless communication based on the wireless LAN (local area network) standard.

Next, the detection unit 113 of FIG. 2 will be explained.

Figure 3:
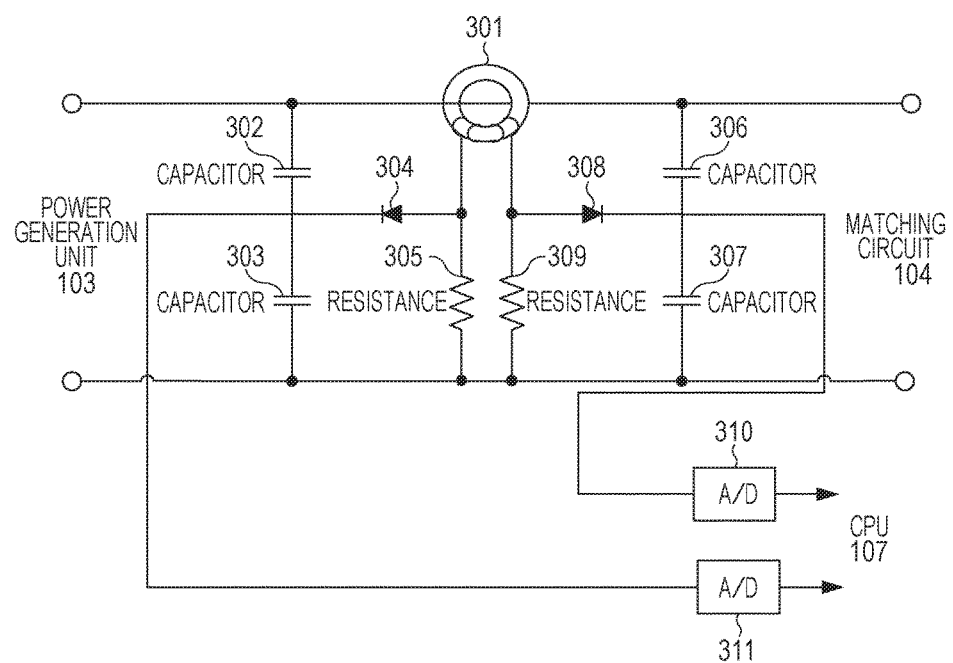
FIG. 3 is a diagram for explaining an example of a detailed configuration of a detection unit of the power supply apparatus according to one embodiment.

FIG. 3 illustrates an example of a detailed configuration of the detection unit 113. As illustrated in FIG. 3, the detection unit 113 includes a toroidal core 301, capacitors 302 and 303, a diode 304, a resistance 305, capacitors 306 and 307, a diode 308 and a resistance 309. Further, the detection unit 113 includes A/D converters 310 and 311.

The detection unit 113 detects a traveling wave of the power output from the power supply antenna 106 as a voltage of the capacitor 307, using CM coupling (mutual inductance coupling and capacitative coupling). Further, the detection unit 113 supplies the detected voltage of the capacitor 307 to the CPU 107 after changing an analog value to a digital value by the A/D converter 310. Further, the detection unit 113 detects a reflection wave of the power output from the power supply antenna 106 as a voltage of the capacitor 303 using the CM coupling. Further, the detection unit 113 supplies the detected voltage of the capacitor 303 to the CPU 107 after changing an analog value to a digital value by the A/D converter 311.

Here, in the detection unit 113, the toroidal core 301 performs the mutual inductance coupling and the capacitors 302 and 306 perform the capacitative coupling.

The CPU 107 detects the voltage supplied from the A/D converter 310 as an amplitude voltage V1 of the traveling wave and detects the voltage supplied from the A/D converter 311 as an amplitude voltage V2 of the reflection wave. The CPU 107 obtains a voltage reflection coefficient ρ based on the amplitude voltage V1 of the traveling wave and the amplitude voltage V2 of the reflection wave. Further, the CPU 107 periodically calculates a voltage standing wave ratio VSWR based on the voltage reflection coefficient ρ.

The voltage standing wave ratio VSWR is a value that expresses a relation between the traveling wave of the power output from the power supply antenna 106 and the reflection wave of the power output from the power supply antenna 106. A value of the voltage standing wave ratio VSWR becomes closer to 1, the value represents an efficient condition with less reflected power and fewer loss of the power supplied from the power supply apparatus 100 to the electronic device 200.

The following mathematical expression (1) expresses the voltage reflection coefficient ρ and the following mathematical expression (2) expresses the voltage standing wave ratio VSWR.

$$\rho = V2/V1 \quad (1)$$

$$VSWR = (1+\rho)/(1-\rho) \quad (2)$$

Hereinafter, the voltage standing wave ratio VSWR is referred to as "VSWR." The CPU 107 can detect whether or not there is a foreign object near the power supply apparatus 100 based on the calculated VSWR. Further, the CPU 107 can detect whether or not there is the electronic device 200 near the power supply apparatus 100 based on the calculated VSWR.

Next, with reference to FIG. 4, an example of the configuration of the electronic device 200 will be explained.

FIG. 4 is a block diagram for explaining an example of components included in the electronic device 200. As illustrated in FIG. 4, the electronic device 200 includes the power receiving antenna 201, a matching circuit 202, a rectifying and smoothing circuit 203, an NFC communication unit 204, a regulator 205, a CPU 206, a ROM 207 and a RAM 208. Further, the electronic device 200 includes a first connection unit 209, a second connection unit 210, a charge control unit 211, a battery 212, an oscillator 213, a power generation unit 214, an operation unit 215, an image processing unit 216 and a switching unit 220.

The power receiving antenna 201 is an antenna for receiving power supplied from the power supply apparatus 100. The electronic device 200 receives the power from the power supply apparatus 100 or performs wireless communication based on the NFC standard with the power supply apparatus 100 via the power receiving antenna 201. Further, when a command from the power supply apparatus 100 is received via the power receiving antenna 201, the electronic device 200 transmits response data corresponding to the command received from the power supply apparatus 100 to the power supply apparatus 100.

The matching circuit 202 is a resonant circuit to resonate between the power supply antenna 106 and the power receiving antenna 201 according to the frequency same as the resonance frequency f of the power supply antenna 106. Further, the matching circuit 202 includes a circuit to perform impedance matching between the power receiving antenna 201 and the rectifying and smoothing circuit 203. In the matching circuit 202, an unillustrated coil and an unillustrated capacitor are included. The CPU 206 controls a value of the coil or a value of the capacitor included in the matching circuit 202 so that the power receiving antenna 201 resonates with a frequency same as the resonance frequency f of the power supply antenna 106. Further, the matching circuit 202 supplies the power received by the power receiving antenna 201 to the rectifying and smoothing circuit 203.

The rectifying and smoothing circuit 203 removes a command and noise from the power supplied from the matching circuit 202 and generates direct-current power. Further, the rectifying and smoothing circuit 203 supplies the generated direct-current power to the regulator 205. Further, the rectifying and smoothing circuit 203 supplies the command removed from the power received by the power receiving antenna 201 to the NFC communication unit 204.

The NFC communication unit 204 performs wireless communication based on the NFC standard. The NFC communication unit 204 analyzes the command supplied from the rectifying and smoothing circuit 203 based on the protocol of the NFC standard and supplies a command analysis result to the CPU 206. When communication power is being supplied from the power supply apparatus 100 to the electronic device 200, the CPU 206 transmits response data corresponding to the received command to the power supply apparatus 100. In this case, the CPU 206 controls the NFC communication unit 204 to vary the load included in the NFC communication unit 204 to transmit the response data corresponding to the received command to the power supply apparatus 100.

The regulator 205 controls to supply the power supplied from one of the rectifying and smoothing circuit 203, battery 212, first connection unit 209, and second connection unit 210 to the electronic device 200. In response to an instruction from the CPU 206, the regulator 205 supplies the power supplied from the power supply apparatus 100 via the rectifying and smoothing circuit 203 to the electronic device 200. In response to the instruction from the CPU 206, the regulator 205 supplies power discharged from the battery 212 via the charge control unit 211 to the electronic device 200. In response to the instruction from the CPU 206, the regulator 205 supplies power supplied via the first connection unit 209 to the electronic device 200. In response to the instruction from the CPU 206, the regulator 205 supplies power supplied via the second connection unit 210 to the electronic device 200.

According to the command analysis result supplied from the NFC communication unit 204, the CPU 206 determines what type of command is received from the NFC communication unit 204 and controls the electronic device 200 to perform a process or operation specified by the received command. Further, the CPU 206 controls the electronic device 200 by executing a computer program stored in the ROM 207.

The ROM 207 stores the computer program for controlling the electronic device 200, information related to the electronic device 200, and the like.

The RAM 208 is a rewritable memory and stores a computer program for controlling the electronic device 200, data transmitted from the power supply apparatus 100, and the like.

The first connection unit 209 includes a terminal to be connected to an unillustrated commercial power source. When the first connection unit 209 is connected to the commercial power source, the first connection unit 209 detects that the electronic device 200 is connected to the commercial power source. On the other hand, when the first connection unit 209 is not connected to the commercial power source, the first connection unit 209 detects that the electronic device 200 is not connected to the commercial power source. When the first connection unit 209 is connected to the commercial power source, the first connection unit 209 converts the alternating-current power supplied from the commercial power source into direct-current power and supplies the converted direct-current power to the regulator 205.

The second connection unit 210 includes a terminal to be connected to an external power supply apparatus. According to the first embodiment, the second connection unit 210 is connected to the external power supply apparatus via a USB (Universal Serial Bus) cable. Here, in this case, the external power supply apparatus is a host device that can supply power to the electronic device 200 via the USB cable and is a personal computer for example.

When the second connection unit 210 and the external power supply apparatus are connected via the USB cable, the second connection unit 210 detects that the electronic device 200 is connected to the external power supply apparatus. When the second connection unit 210 and the external power supply apparatus are not connected via the USB cable, the second connection unit 210 detects that the electronic device 200 is not connected to the external power supply apparatus. When the second connection unit 210 and the external power supply apparatus are connected, the second connection unit 210 supplies power supplied from the external power supply apparatus to the regulator 205.

When power from one of the rectifying and smoothing circuit 203, first connection unit 209, and second connection unit 210 is supplied from the regulator 205, the charge control unit 211 charges the battery 212 with the power supplied from the regulator 205. Further, when power is discharged from the battery 212, the charge control unit 211 supplies the power discharged from the battery 212 to the regulator 205. The charge control unit 211 periodically detects information indicating a remaining capacity of the battery 212 and information related to charging of the battery 212 and informs the detected information to the CPU 206.

The battery 212 is a battery detachable from the electronic device 200. Further, the battery 212 is a chargeable secondary battery and is a lithium ion battery or the like for example. Further, the battery 212 may be a battery other than a lithium ion battery.

The oscillator 213 oscillates a frequency used to control the power generation unit 214 to convert the power supplied from the regulator 205 via the switching unit 220 into a target power set by the CPU 206. Here, as the oscillator 213, a crystal oscillator or the like is used.

The power generation unit 214 generates power to output outside via the power receiving antenna 201 based on the power supplied from the regulator 205 and the frequency oscillated by the oscillator 213. The power generation unit 214 internally has an FET or the like and generates power to output outside according to the frequency oscillated by the oscillator 213. Here, the power generated by the power generation unit 214 is supplied to the NFC communication unit 204. Further, the power generated by the power generation unit 214 is assumed to be communication power.

Here, when electronic device 200 does not transmit a command according to the NFC standard to the power supply apparatus 100, the CPU 206 controls the switching unit 220 not to connect the oscillator 213 and the regulator 205 and stops the operation by the power generation unit 214. On the other hand, when the electronic device 200 transmits a command according to the NFC standard to the power supply apparatus 100, the CPU 206 controls the switching unit 220 to connect the oscillator 213 and the regulator 205 and starts the operation by the power generation unit 214. In this case, the NFC communication unit 204 superimposes the command to the communication power supplied from the power generation unit 214 so that a command which is superimposed to communication power is transmitted to the power supply apparatus 100 via the power receiving antenna 201.

The operation unit 215 is a user interface to operate the electronic device 200. The operation unit 215 includes a power button to operate the electronic device 200 and a mode switch button to switch a mode of the electronic device 200, and the like and those buttons are composed of a switch, a touch panel, or the like. When a user operates the operation unit 215, the operation unit 215 supplies a signal corresponding to the operation by the user to the CPU 206. Here, the operation unit 215 may control the electronic device 200 according to a remote control signal received from an unillustrated remote controller.

The image processing unit 216 includes an image capture unit 217, a wireless communication unit 218 and a storage unit 219.

The image capture unit 217 includes an image capture element for generating image data based on an optical image of a subject, an image processing circuit for performing image processing on the image data generated by the image capture element, a compression/decompression circuit for compressing image data or decompressing compressed image data, and the like. The image capture unit 217 captures an image of the subject and supplies image data such as a still image and a moving image obtained as a result of the image capturing to the storage unit 219. The storage unit 219 stores the image data supplied from the image capture unit 217 in the storage medium 219a. Here, the image capture unit 217 may further include a configuration needed to capture an image of the subject.

The wireless communication unit 218 can transmit image data and audio data stored in the ROM 207 or the storage medium 219a to the power supply apparatus 100 and receive image data and audio data from the power supply apparatus 100. Further, the wireless communication unit 218 transmits and receives image data and audio data according to a communication protocol which is in common with the wireless communication unit 112. For example, the wireless communication unit 218 is assumed to perform wireless communication according to the wireless LAN standard, similarly to the wireless communication unit 112.

The storage unit 219 stores data such as image data, audio data, and the like supplied from one of the wireless communication unit 218 and the image capture unit 217 to the storage medium 219a. Further, the storage unit 219 can read data such as image data, audio data, and the like from the storage medium 219a and supply the data to one of the RAM 208 and the wireless communication unit 218. Here, the storage medium 219a may be a hard disc, a memory card, or the like or may be a device incorporated in the electronic device 200 or an external storage medium which is detachable from the electronic device 200.

Here, the image processing unit 216 includes a unit to which power is supplied from the regulator 205 when the power of the electronic device 200 is on. Thus, the image processing unit 216 may further include a display unit for displaying image data, a unit for transmitting and receiving electronic mail, or the like in addition to the image capture unit 217, the wireless communication unit 218, the storage unit 219, and the storage medium 219a.

The switching unit 220 includes a switch to connect the oscillator 213 and the regulator 205. When the switching unit 220 is on, the oscillator 213 and the regulator 205 are connected and, when the switching unit 220 is not on, the oscillator 213 and the regulator 205 are not connected. The CPU 206 controls whether to turn on or turn off the switching unit 220 according to whether or not to transmit a command defined by the NFC standard.

Here, the power supply antenna 106 and the power receiving antenna 201 may be a helical antenna or a loop antenna, or may be a planar antenna such as a meander line antenna and the like.

According to the first embodiment, the power supply apparatus 100 performs wireless power supply to the electronic device 200 in accordance with a magnetic field resonance method; however, this example does not set any limitation. For example, the power supply apparatus 100 may perform wireless power supply to the electronic device 200 in accordance with electric field coupling as a substitute for the magnetic field resonance method. In this case, an electrode needs to be provided to the power supply apparatus 100 and the electronic device 200 and power is wirelessly supplied from the electrode of the power supply apparatus 100 to the electrode of the electronic device 200.

Further, for example, the power supply apparatus 100 may perform wireless power supply to the electronic device 200 in accordance with an electromagnetic induction as a substitute for the magnetic field resonance method.

Further, for example, the power supply apparatus 100 may perform wireless power supply to the electronic device 200 in accordance with a standard specified in WPC (Wireless Power Consortium) ("Qi" standard) as a substitute for the magnetic field resonance method.

Further, for example, the power supply apparatus 100 may perform wireless power supply to the electronic device 200 in accordance with the standard specified in WPT (Wireless Power Transmission) as a substitute for the magnetic field resonance method.

Further, for example, the power supply apparatus 100 may perform wireless power supply to the electronic device 200 in accordance with a standard specified in CEA (Consumer Electronics Association) as a substitute for the magnetic field resonance method.

The following explanation will be given under an assumption that the power supply apparatus 100 supplies power to the electronic device 200 in a wireless manner; however, the term "wireless" may be replaced by a term "contactless" or "non-contact."

According to the first embodiment, the power supply apparatus 100 is assumed to perform wireless communication in accordance with the NFC standard with the electronic device 200. Thus, in the power supply apparatus 100, the CPU 107 is assumed to perform control so that the resonance frequency f of the power supply antenna 106 becomes 13.56 MHz.

(Process in Electronic Device 200)

Next, a process executed by the electronic device 200 will be explained with reference to a flowchart of FIG. 5.

Figure 5:
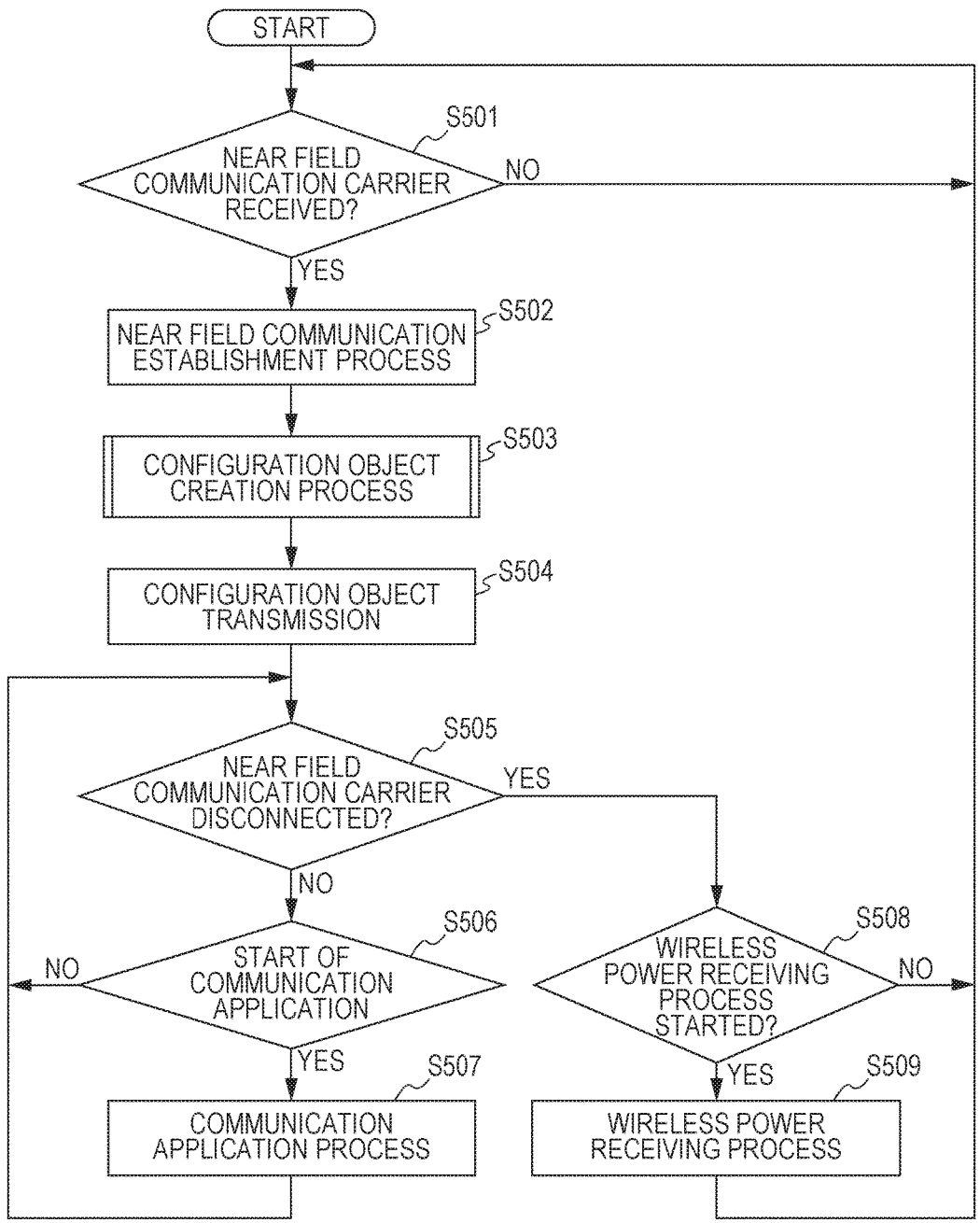
FIG. 5 is a flowchart for explaining an example of a process performed in the electronic device according to one embodiment.

FIG. 5 is a flowchart for explaining an example of the process executed by the electronic device 200. Here, a program for controlling the process explained with this flowchart is to be executed by the CPU 206 and is stored in the ROM 207.

In S501, the CPU 206 detects, with the power receiving antenna 201, a carrier wave for polling, which indicates that the power supply apparatus 100 exists in a range where near field communication is executable. When the carrier wave for polling is not detected (S501, NO), the CPU 206 stands by until detected. When the carrier wave for polling is detected (S501, YES), the CPU 206 proceeds to S502.

In S502, the CPU 206 analyzes the carrier wave received by the NFC communication unit 204, starts a near wireless communication process according to the standard, and establishes communication of near field communication. More specifically, the CPU 206 transmits, as response information, device ID information of the electronic device 200, and device information such as upper layer protocol (communication method) information that the electronic device 200 supports to the power supply apparatus 100. Thereby, communication is established. Here, the upper layer protocol information is information related to a mode such as a reader/writer mode, a P2P mode, and a card emulation mode. Based on the information, the power supply apparatus 100 can determine in which mode the communication is to be performed when communicating with the electronic device 200.

Next, in S503, the CPU 206 creates a configuration object to transmit information to the power supply apparatus 100. Here, the information to be stored in the configuration object is information related to a communication application using near field communication, which is included in the electronic device 200. By obtaining the configuration object of the electronic device 200, the power supply apparatus 100 can recognize information related to the communication application that the electronic device 200 supports and, based on the information, can start and execute the communication application.

Further, as the communication application, there are a communication application related to the wireless power supply, a communication application related to handover for wireless LAN, a communication application related to a smart poster, and the like. The communication application related to handover for wireless LAN is an application that performs only pairing with a communication partner using near field communication and makes an actual data transfer be executed by wireless LAN communication. In near communication, an authentication process of the communication partner is executed, the communication partner is confirmed, and information to establish communication of wireless LAN communication is exchanged. The communication application related to smart poster is an application that executes near field communication with a near communication tag IC built in a poster or the like and obtains URL information of the Internet, or the like.

Here, a detail process for creating a configuration object will be described later with reference to FIG. 6.

In S504, when a configuration object transmission request from the power supply apparatus 100 is received, the CPU 206 transmits the configuration object created in S503 to the power supply apparatus 100 using the NFC communication unit 204.

Next, in S505, the CPU 206 confirms whether or not the carrier wave that the power receiving antenna 201 is continuously receiving from the power supply apparatus 100 is disconnected. When the carrier wave that the power receiving antenna 201 has been receiving from the power supply apparatus 100 is disconnected (S505, YES), the CPU 206 terminates the near field communication established with the power supply apparatus 100 and the process proceeds to S508.

Next, in S508, the CPU 206 confirms whether or not the power receiving antenna 201 has received supplying power for wireless power supply within a predetermined period of time. When the power receiving antenna 201 has not received the supplying power for wireless power supply within the predetermined period of time (S508, NO), the process returns to S501 and the CPU 206 returns in an initial state to be stand by for receiving carrier wave for polling in near field communication.

When the power receiving antenna 201 has received the supplying power for wireless power supply within the predetermined period of time (S508, YES), the CPU 206 starts a wireless power receiving process in S509. In the wireless power receiving process, the power receiving antenna 201 receives the supplying power for wireless power supply from the power supply apparatus 100, the matching circuit 202 and the rectifying and smoothing circuit 203 convert the power into direct-current power, the power is supplied to the battery 212 via the regulator 205, and the battery 212 is charged. Since the details of the wireless power supply process is not directly related to the present application, the detailed explanation will be omitted. Then, when detecting that the reception of the supplying power for wireless power supply is finished in the wireless power supply process, the CPU 206 terminates the wireless power receiving process in S509 and the process proceeds to S501.

On the other hand, when the power receiving antenna 201 is continuously receiving the carrier wave from the power supply apparatus 100 (S505, NO), the CPU 206 stands by for receiving a communication application start request from the power supply apparatus 100. The power supply apparatus 100 can select a communication application to start with from information related to communication applications stored in the configuration object received from the electronic device 200 and start to execute the communication application. For example, it is assumed that information related to three types of communication applications, which are a wireless power supply application, a wireless LAN handover application, and a smart poster application is stored in the configuration object. In this case, the power supply apparatus 100 can decide which application is to be executed from the three types of applications.

When a communication application start request is not received from the power supply apparatus 100 (S506, NO), the process returns to S505 and the CPU 206 repeats a carrier wave disconnection confirming process and a communication application start stand by process thereafter.

On the other hand, when a communication application start request is received from the power supply apparatus 100 (S506, YES), the CPU 206 starts to execute the requested communication application in S507. The communication applications requested by the power supply apparatus 100 are only the communication applications included in the configuration object transmitted from the electronic device 200 in S504. More specifically, they are the communication application for wireless power supply, the communication application for handover to perform wireless LAN, the communication application for smart poster, and the like; however, the details of the process are omitted.

When the process for the communication application is completed, the process returns to S505 and a stand-by process is repeated until the carrier wave for near field communication is disconnected or a new communication application is started in S506.

By executing the above process sequence, the electronic device 200 detects a communication request of near field communication from the power supply apparatus 100 with the carrier wave for polling and establishes the near field communication. Then, the electronic device 200 transmits, to the power supply apparatus 100, a configuration object which stores information related to communication applications that the electronic device 200 handles. This helps to inform information of executable communication applications to the power supply apparatus 100 and specify a communication application requested by the power supply apparatus 100. Here, when information of a plurality of communication applications is stored in the configuration object, the determination which communication application among the plurality of applications to execute is made by the power supply apparatus 100, not by the electronic device 200.

Next, with reference to FIG. 6, details of the process to create a configuration object in S503 will be explained.

Figure 6:
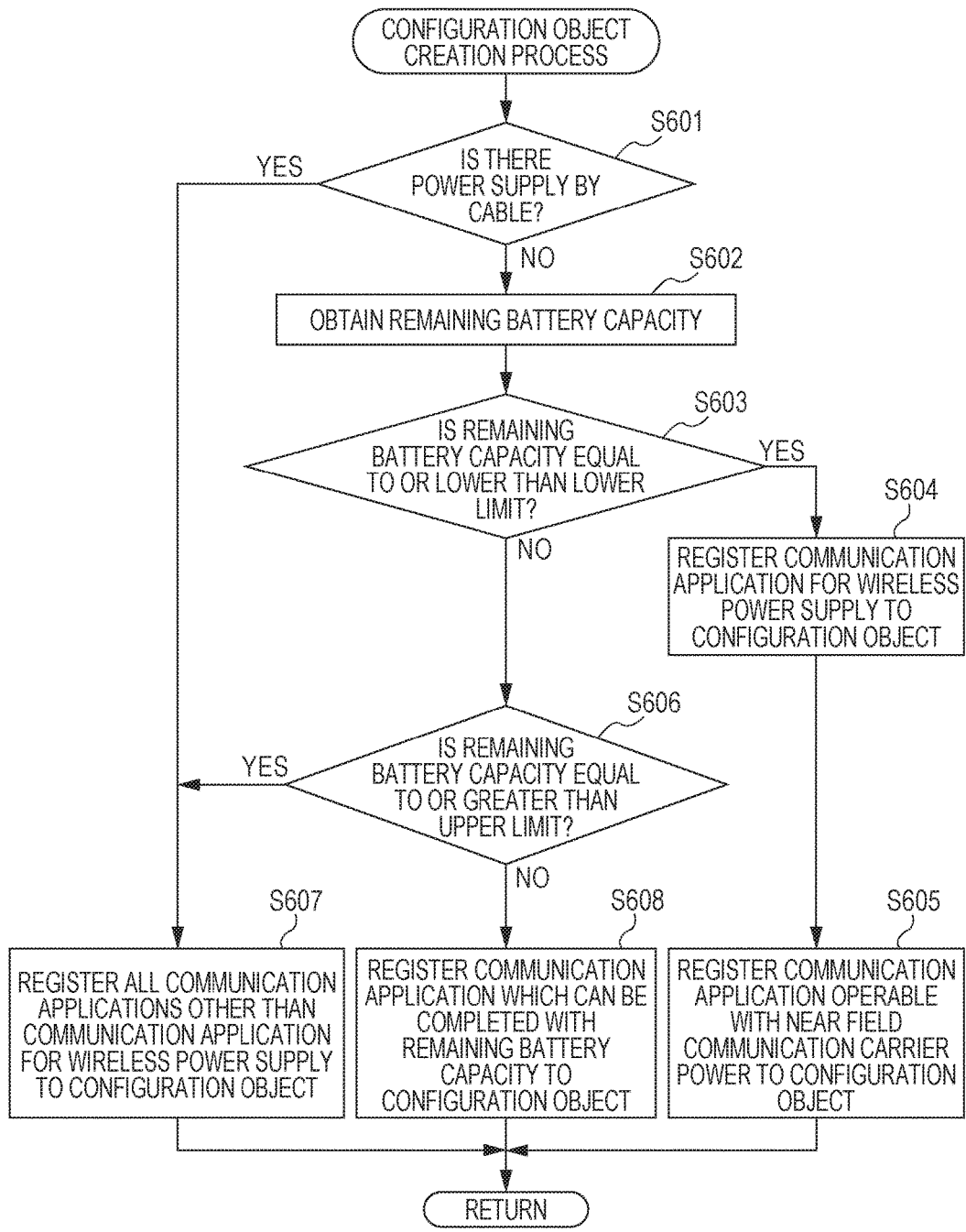
FIG. 6 is a flowchart for explaining a detailed process procedure of creating a configuration object according to a first embodiment.

FIG. 6 is a flowchart for explaining details of the process procedure for creating a configuration object in S503 according to the first embodiment.

When the configuration object creating process (S503) starts, firstly in S601, the CPU 206 confirms, using the charge control unit 211, whether or not a cable is inserted to the first connection unit 209 or the second connection unit 210 and power is being supplied through the cable. Then, when a cable is not inserted to the first connection unit 209 or the second connection unit 210 or when a cable is inserted but power is not supplied (S601, NO), the process proceeds to S602.

In S602, the CPU 206 obtains information related to the remaining capacity of the battery 212 by controlling the charge control unit 211.

Next, in S603, based on the information related to the remaining capacity of the battery 212 obtained in S602, the CPU 206 compares the remaining capacity of the battery 212 with a previously set lower limit (first predetermined value) of the remaining capacity of the battery 212. Then, as a result that the CPU 206 compares the remaining capacity of the battery 212 with the previously set lower limit of the remaining capacity of the battery 212, when the remaining capacity of the battery 212 is equal to or lower than the lower limit (equal to or lower than the first predetermined value) (S603, YES), the process proceeds to S604. Here, the lower limit of the remaining capacity is a threshold value to determine a condition that the remaining capacity of the battery 212 is low and the battery 212 needs to be charged as a matter of priority. When the remaining capacity is equal to or lower than the threshold value, it is in a condition that wireless power supply needs to be performed as a matter of priority and execution of a communication application or the like, which reduces the remaining capacity of the battery 212 needs to be avoided.

Next, in S604, the CPU 206 stores communication application information related to the wireless power supply in the configuration object formed in the RAM 208. Here, the communication application information related to the wireless power supply includes a corresponding wireless power supply system, a version of the power supply method, device unique information related to wireless product unique ID information or the like. Further, the communication application information related to the wireless power supply also includes information related to a device condition such as a remaining capacity of the battery 212, a charging error status, a requesting power supplying amount, a requesting near wireless communication probability or the like. The device unique information is formed based on the information stored in the ROM 207. On the other hand, the information related to a device condition is obtained by the CPU 206 controlling the charge control unit 211. Thereby, the power supply apparatus 100 can control the power supply sequence corresponding to the executable wireless power supply system and the power receiving device condition, based on the communication application information related to the wireless power supply, which is stored in the configuration object received from the electronic device 200.

Next, in S605, the CPU 206 stores information, which is stored in the ROM 207, related to a communication application operable with only the carrier power (communication power) of near field communication, to the configuration object in the RAM 208. The communication application operable with only the communication power is a communication application that can be operated using only the communication power even when the remaining capacity of the battery 212 is empty and there is no power supply from the second connection unit 210 through a cable. More specifically, for example, it is an application, which operates in a TAG mode such as the smart poster application, and is limited to an application which can be executed with power supplied only to a block minimum required to perform the near field communication.

When the process in S605 is completed, the CPU 206 determines that the creation of the configuration object is completed and terminates the configuration object creation process (S503).

As described above, when the remaining capacity of the battery 212 is equal to or lower than the above described lower limit, it is necessary to prevent execution of a communication application that reduces the remaining capacity of the battery 212. Thus, only the communication application for wireless power supply and the communication application which can be operated using only communication power are stored in the configuration object. With this structure, the electronic device 200 can limit the near field communication application to be started by the power supply apparatus 100 only to the communication application for wireless power supply and the communication application operable using only with communication power. Thus, execution of a communication application that affects the remaining capacity of the battery 212 can be prevented.

On the other hand, as a result of the comparison by the CPU 206 between the information, obtained in S602, related to the remaining capacity of the battery 212 and the previously set lower limit of the remaining capacity of the battery 212, when the remaining capacity is greater than the lower limit of the remaining battery capacity (S603, NO), the process proceeds to S606.

Next, in S606, the CPU 206 compares the information, obtained in S602, related to the remaining capacity of the battery 212 with a previously set upper limit (second predetermined value) of the remaining capacity of the battery 212. Then, as a result of the comparison by the CPU 206 between the remaining capacity of the battery 212 and the previously set upper limit of the remaining capacity of the battery 212, when the remaining capacity of the battery 212 is equal to or greater than the upper limit (equal to or greater than the second predetermined value) (S606, YES), the process proceeds to S607. Here, the upper limit of the remaining capacity is a threshold value to determine a condition that the remaining capacity of the battery 212 is large and the battery 212 does not need to be charged as a matter of priority. When the remaining capacity is equal to or larger than the threshold value, it is in a condition that the wireless power supply does not need to be charged as a matter of priority and a near field communication application other than the wireless power supply is to be executed.

Next, in S607, the CPU 206 stores, in the configuration object formed in the RAM 208, communication application information other than the communication application related to wireless power supply. The communication application information other than the communication application related to wireless power supply is information previously stored in the ROM 207 and, according to the first embodiment, the communication application information related to handover for executing wireless LAN and smart poster. When the process in S607 is completed, the CPU 206 determines that the configuration object creation is completed and terminates the configuration object creation process (S503).

Further, also when a cable is inserted to the first connection unit 209 or the second connection unit 210 and power is being supplied (S601, YES), the process proceeds to S607. Then, the similar process is performed and the configuration object creation process (S503) ends.

As explained above, when the remaining capacity of the battery 212 is equal to or larger than the upper limit, since the remaining capacity of the battery 212 is large enough, it is not necessary to execute the communication application for wireless power supply to charge the battery 212 as a matter of priority. Further, in a condition that power is being supplied from outside through a cable, the communication application for wireless power supply does not need to be executed urgently to charge the battery 212 in a similar manner. Thus, all communication applications other than the communication application for wireless power supply are stored in configuration object. With this structure, the electronic device 200 can limit the near field communication application started by the power supply apparatus 100 to communication applications other than the communication application for wireless power supply and execution of the communication application for unnecessary wireless power supply can be prevented.

Further, as a result of the comparison by the CPU 206 between the remaining capacity of the battery 212 and the previously set upper limit of the remaining capacity of the battery 212, when the remaining capacity of the battery 212 is less than the upper limit (S606, NO), the process proceeds to S608. Then, the CPU 206 selects a communication application whose process is assumed to be completed with the current remaining capacity of the battery 212 and stores the selected communication application in the configuration object. As a method for selecting a communication application, power consumption information corresponding to each communication application is previously stored in the ROM 207 and the information and the current remaining capacity of the battery 212 are compared to determine the application to be selected. More specifically, according to the first embodiment, regarding the above described three applications, the power consumption information and the remaining capacity of the battery 212 are compared and a communication application to be stored is determined.

When the process in S608 is completed, the CPU 206 determines that the creation of the configuration object is completed and terminates the configuration object creation process (S503).

As explained above, when the remaining capacity of the battery 212 is equal to or larger than the lower limit and less than the upper limit, a communication application executable with the current remaining capacity and a communication application for wireless power supply to increase the remaining capacity of the battery 212 are stored in the configuration object. With this configuration, the electronic device 200 can limit the near field communication application started by the power supply apparatus 100 to the communication application for wireless power supply or the communication application executable with the current remaining battery capacity. This can prevent a situation that a communication application which has started is discontinued due to lack of the remaining capacity of the battery 212.

As described above, the electronic device 200 stores the near field communication application information to the configuration object in view of the remaining capacity of the battery 212 and transmits the configuration object to the power supply apparatus 100. This can prevent a situation that, regarding the communication application started in response to a request transmitted from the power supply apparatus 100, the operation cannot be completed due to lack of the remaining capacity of the battery 212 of the electronic device 200.

(Process in Power Supply Apparatus 100)

Next, a process performed in the power supply apparatus 100 will be explained with reference to a flowchart of FIG. 7.

Figure 7:
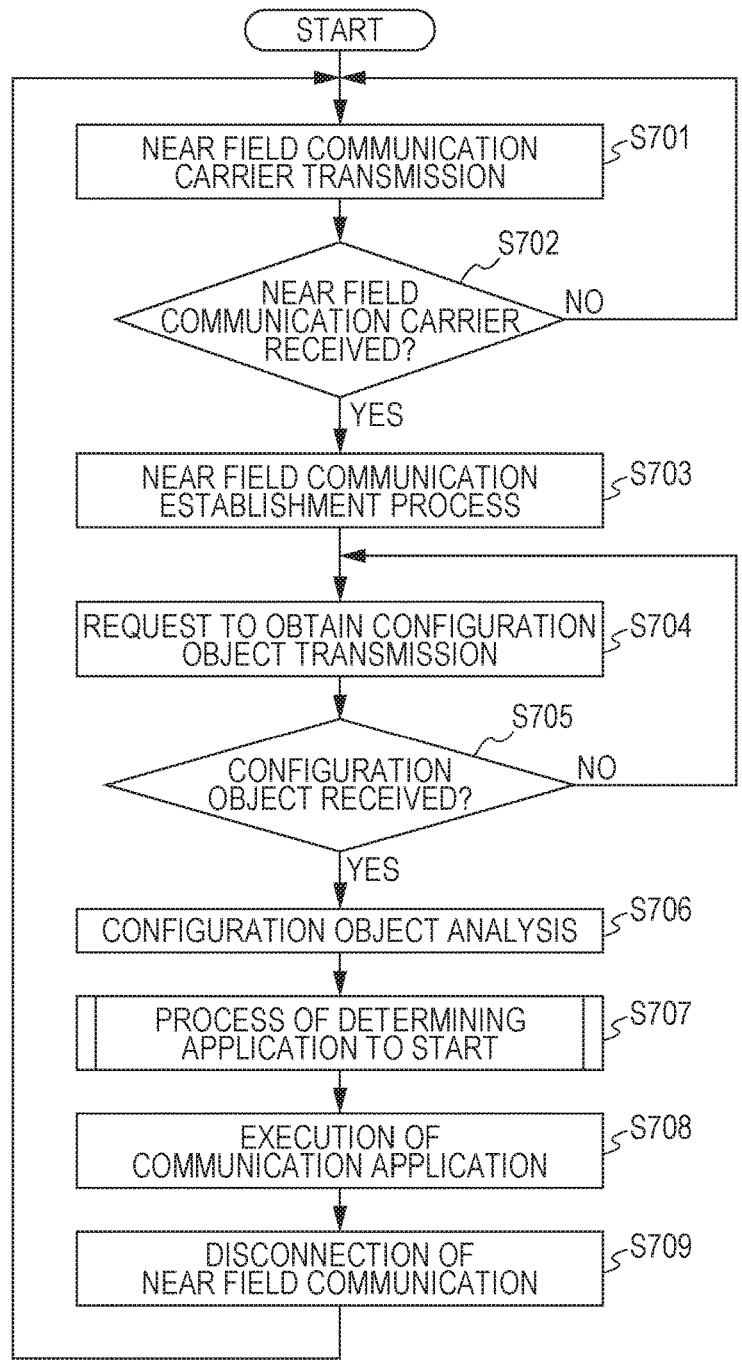
FIG. 7 is a flowchart for explaining an example of a process performed in the power supply apparatus according to one embodiment.

FIG. 7 is a flowchart for explaining an example of a process performed in the power supply apparatus 100. Here, the program for controlling the process explained in this flowchart is to be executed by the CPU 107 and is stored in the ROM 108.

Firstly, in S701, the CPU 107 controls the oscillator 102, the power generation unit 103, and the matching circuit 104 and transmits a carrier wave for polling to detect whether or not the distance between the power supply apparatus 100 and the electronic device 200 is in a predetermined range.

Next, in S702, the CPU 107 determines whether or not the electronic device 200 is placed within the predetermined range based on whether or not a response from the electronic device 200 is received within a predetermined period of time. Then, when the CPU 107 determines that the electronic device 200 is not placed within the predetermined range (S702, NO), the process returns to S701 and the CPU 107 restarts to transmit a carrier wave to detect whether or not the distance from the electronic device 200 is within the predetermined range.

On the other hand, when the CPU 107 determines that the electronic device 200 is placed within a predetermined range (S702, YES), the process proceeds to S703 and the CPU 107 obtains device information of the electronic device 200 and confirms the condition of the electronic device 200.

In S703, according to the program stored in the ROM 108, the CPU 107 controls the NFC communication unit 105 to generate and transmit an ASK modulated signal and receives a load modulated signal corresponding to the transmission signal. With this series of processes, a device authentication process, which is specified by ISO14443-3, ISO18092, NFC Digital Protocol, or the like, is performed. For example, an existence of the electronic device 200 is confirmed and, when there are a plurality of devices, the electronic device 200 to communicate with is selected based on ID information from the plurality of devices and is made active. Further, in a case of ISO14443-3 standard, the CPU 107 stores UID (Unique Identifier) information of the electronic device 200 in the RAM 109. On the other hand, in a case of ISO18092, the CPU 107 stores NFCID (Near Field Communication Identifier) information of the electronic device 200 in the RAM 109. With this series of processes, connection of near field communication is established between the power supply apparatus 100 and the electronic device 200.

Next, in S704, the CPU 107 controls the NFC communication unit 105 and transmits a request to obtain, from the electronic device 200, information of a configuration object that stores information related to the communication application for near field communication included in the electronic device 200.

Next, in S705, the CPU 107 stands by for a reception of the requested configuration object from the electronic device 200 for a predetermined period of time. Then, when the configuration object is not received from the electronic device 200 within the predetermined period of time (S705, NO), the process returns to S704 and the CPU 107 retransmits the configuration object request. On the other hand, when the configuration object is received from the electronic device 200 within the predetermined period of time (S705, YES), the process proceeds to S706 and the CPU 107 analyzes the received configuration object.

In S706, the CPU 107 analyzes, from the received configuration object, the information of the communication application that the electronic device 200 includes. Further, detailed information of each communication application is also obtained by analyzing the configuration object. The detailed information of each communication application is information required to execute the communication application. For example, in a case of a communication application for wireless power supply, the required information is a corresponding wireless power supply system, the version of the power supply method, and device unique information such as wireless product unique ID information. Further, information related to the device condition such as a remaining battery capacity, a charging error status, a requesting supplying power amount, a requesting near wireless communication probability or the like is also included in the required information. Based on the information, the power supply apparatus 100 can perform wireless power supply to the electronic device 200.

Next, in S707, the CPU 107 determines a communication application to start executing from the configuration object received from the electronic device 200. When there are a plurality of communication applications in the configuration object, it may be determined from which communication application to start with based on user's operation; however, in general, a communication application which is registered in the top of the list is firstly executed.

Next, in S708, the CPU 107 executes the determined communication application. The execution of the communication application is performed according to a specification defined in the communication application and the details are omitted here. Further, when there are a plurality pieces of communication application information in the configuration object, all the communication applications may be executed at once or only one of the communication applications may be executed.

When the execution of the communication application is completed, in S709, the CPU 107 stops transmitting the carrier wave of near field communication and terminates the near field communication.

When the communication ends, the process returns to S701 and the process is restarted from the transmission of the carrier wave for polling.

As described above, according to the first embodiment, the power supply apparatus 100 starts executing any of the communication applications from the communication application information in the configuration object received from the electronic device 200. In other words, the power supply apparatus 100 can determine a communication application to start based on its own determination without considering the condition or the like of the electronic device 200. According to the first embodiment, the electronic device 200 stores, in the configuration object, a communication application corresponding to its device condition. Thus, even if the power supply apparatus 100 executes any communication application stored in the configuration object received from the electronic device 200, it may be a communication application preferable to the electronic device 200. More specifically, for example, when the remaining capacity of the battery 212 of the electronic device 200 is low, the wireless power supply may firstly be started to charge the battery 212 as a matter of priority.

According to the first embodiment, the power supply apparatus 100 and the electronic device 200 perform wireless communication according to NFC. However, the power supply apparatus 100 and the electronic device 200 may perform near wireless communication other than the wireless communication according to NFC as long as near wireless communication is performed. The power supply apparatus 100 and the electronic device 200 may perform wireless communication according to FeliCa (registered trademark) standard, as a substitute for the wireless communication according to the NFC standard. Further, the power supply apparatus 100 and the electronic device 200 may perform wireless communication according to RFID (Radio Frequency IDentification), as a substitute for the wireless communication according to NFC. Further, the power supply apparatus 100 and the electronic device 200 may perform wireless communication according to MIFARE (registered trademark) standard (ISO/IEC 14443), as a substitute for the wireless communication according to NFC. Further, the power supply apparatus 100 and the electronic device 200 may perform wireless communication according to TransferJet (registered trademark) standard, as a substitute for the wireless communication according to NFC.

[Second Embodiment]

In the communication system described in the first embodiment, the electronic device 200 determines communication application to be stored in the configuration object according to its device condition. In contract, in a communication system according to the second embodiment, the electronic device 200 stores all communication application included therein in the configuration object regardless of its device condition and transmits the configuration object to the power supply apparatus 100. Then, the power supply apparatus 100 determines a communication application to start based on the information related to the device condition of the electronic device 200 stored in the configuration object received from the electronic device 200. With this structure, a communication apparatus, which is preferable to the device condition of the electronic device 200 is started.

Hereinafter, the second embodiment will be described in detail with reference to the drawings. Since the block configuration of a power supply apparatus 100 that configures the communication system according to the second embodiment is similar to the configuration of the first embodiment illustrated in FIGS. 2 and 3, the explanation thereof will be omitted. Further, since the block configuration of an electronic device 200 that configures the communication system according to the second embodiment is similar to the configuration of the first embodiment illustrated in FIG. 4, the explanation thereof will be omitted. Next, a detailed process in the electronic device 200 and a detailed process in the power supply apparatus 100 will be explained.

(Process in Electronic Device 200)

Since all the basic process procedures of the electronic device 200 according to the second embodiment are the same as the flow from S501 to S509 in FIG. 5 of the first embodiment, the explanation thereof will be omitted. A different process between the first embodiment and the second embodiment is a content of the process in the configuration object creation process (S503). According to the first embodiment, the configuration object is created with the procedure illustrated in FIG. 6; however, the second embodiment has a different procedure and the procedure will be explained with reference to FIG. 8.

Figure 8:
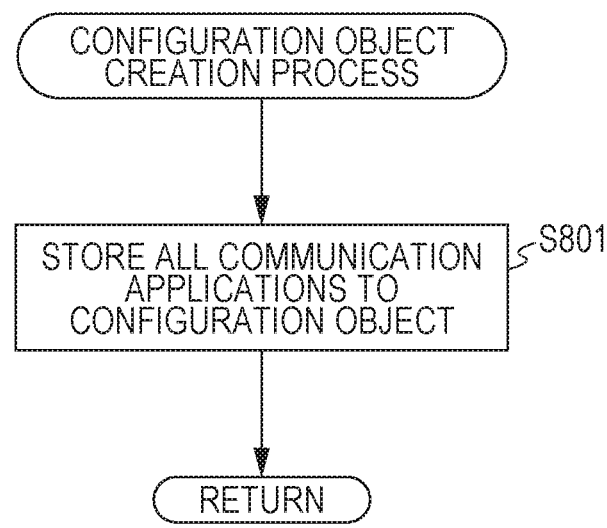
FIG. 8 is a flowchart for explaining a detailed process procedure of creating a configuration object according to a second embodiment.

FIG. 8 is a flowchart for explaining a detailed process procedure of the configuration object creation of S503 in the first embodiment.

When the configuration object creation process (S503) is started, in S801, the CPU 206 stores information, which is stored in the ROM 207, of all the communication applications included in the electronic device 200 to the configuration object. Then, when the configuration object creation is completed, the CPU 206 terminates the configuration object creation process (S503).

With this structure, according to the second embodiment, the electronic device 200 stores all communication applications included therein to the configuration object regardless of its device condition or the like and transmits the configuration object to the power supply apparatus 100.

(Process in Power Supply Apparatus 100)

According to the second embodiment, the process content of the start application determining process (S707) differs from the first embodiment. Since other processes are similar to those in FIG. 7, the explanation thereof will be omitted. Hereinafter, with reference to FIG. 9, a process to determine a communication application to start (S707) in the power supply apparatus 100 will be explained in detail.

Figure 9:
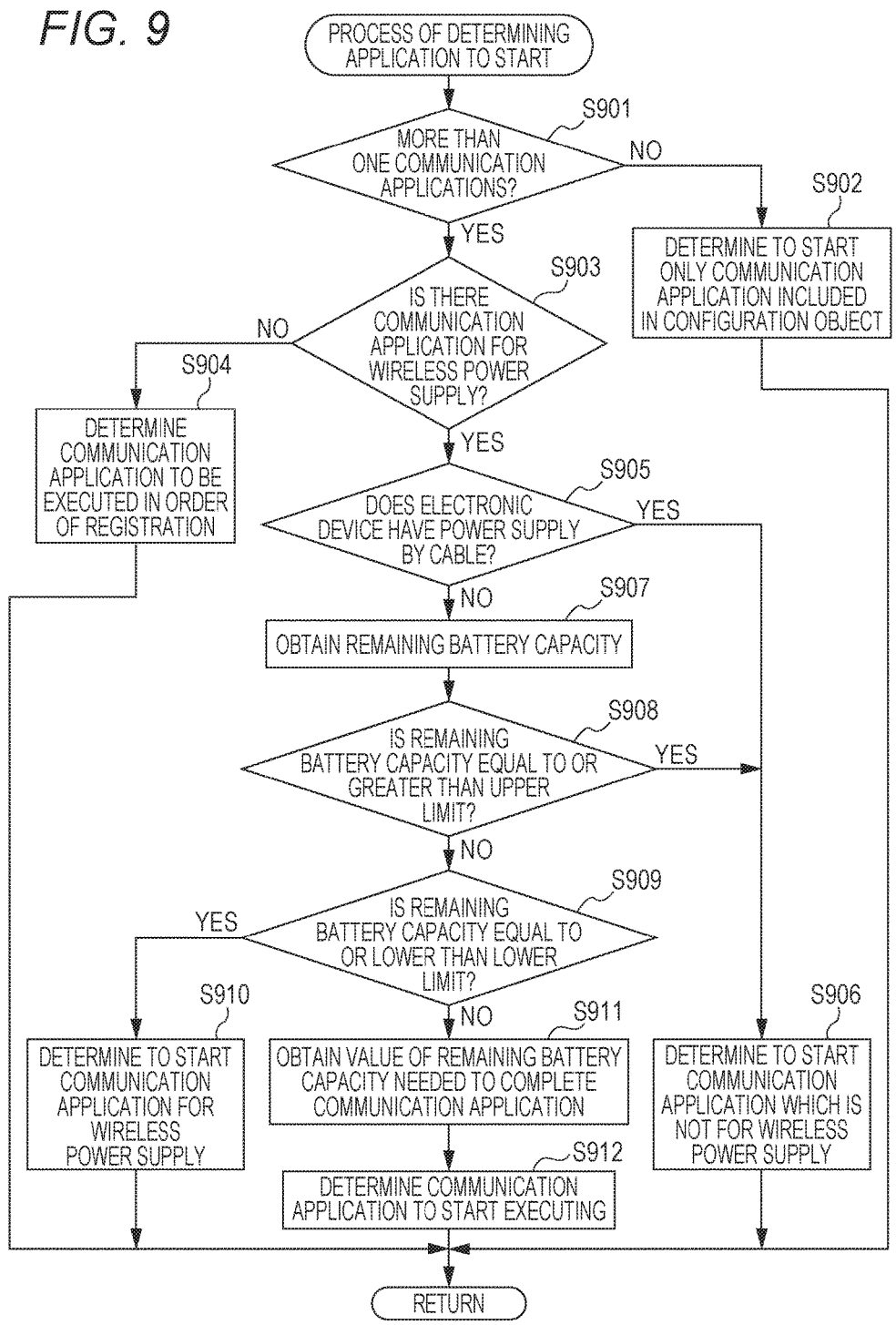
FIG. 9 is a flowchart for explaining a detailed process procedure of determining a communication application to start according to the second embodiment.

FIG. 9 is a flowchart for explaining a detailed process procedure of S702 in FIG. 7 for determining a communication application to start according to the second embodiment.

When the process proceeds to the start application determining process in S707 after the power supply apparatus 100 performs processes in S701 to S706 of FIG. 7, in S901, the CPU 107 confirms whether or not there is information related to a plurality of communication applications in the obtained configuration object. Then, when there is only information relating to one communication application provided in the obtained configuration object (S901, NO), the process proceeds to S902. Then, in S902, the CPU 107 determines the only communication application for which information has been provided as the communication application to start and terminates the start communication application determining process (S707).

On the other hand, when there is information related to a plurality of communication applications in the obtained configuration object (S901, YES), the process proceeds to S903. Then, in S903, the CPU 107 confirms whether or not there is a communication application for wireless power supply in the plurality of communication applications written in the configuration object.

When there is not a communication application for wireless power supply in the plurality of communication applications written in the configuration object (S903, NO), the process proceeds to S904. Then, in S904, the CPU 107 determines to execute the communication applications for which information has been provided in order of their registration in the configuration object, and terminates the start communication application determining process (S707).

On the other hand, when there is a communication application for wireless power supply in the plurality of communication applications written in the configuration object (S903, YES), the process proceeds to S905. Then, in S905, the CPU 107 analyzes the communication application information for wireless power supply in the configuration object. As part of this analysis, it is determined whether or not the electronic device 200 has power supply by cable. The communication application information for wireless power supply provided in the configuration object includes information related to a power state of the electronic device 200, which is a communication partner, and the CPU 107 refers to the information related to whether there is power supply by cable.

Referring to the information related to whether or not there is power supply by cable, when the electronic device 200 is receiving power supply by cable (S905, YES), the process proceeds to S906. Then, in S906, the CPU 107 determines a communication application other than an application relating to wireless power supply, from the communication applications registered in the configuration object, as a next communication application to start. In some cases, when there is more than one communication application which is not related to wireless power supply in the configuration object, the communication applications are started in order of their registration in the configuration object. Then, after the process of S906, the CPU 107 terminates the start application determining process (S707).

On the other hand, referring to the information related to whether or not there is power supply by cable, when the electronic device 200 does not have power supply by cable (S905, NO), the process proceeds to S907. Then, in S907, the CPU 107 obtains information related to the remaining capacity of the battery 212, which is written in the communication application information for wireless power supply in the configuration object.

Next, in S908, the CPU 107 confirms whether or not the remaining capacity of the battery 212 is equal to or greater than an upper limit. The upper limit used here is information stored in the ROM 108 and is a value used to determine a condition that the battery 212 does not need to be charged. When the obtained remaining capacity of the battery 212 is equal to or greater than the upper limit (S908, YES), the process proceeds to S906. Then, in S906, the CPU 107 determines a communication application which is not for wireless power supply as a communication application to start, from the communication applications registered in the configuration object.

On the other hand, when the remaining capacity of the battery 212 is lower than the upper limit (S908, NO), the process proceeds to S909. Then, in S909, the CPU 107 confirms whether or not the remaining capacity of the battery 212 is equal to or lower than a lower limit. The lower limit used here is information stored in the ROM 108 similarly to the upper limit and a value used to determine whether or not the battery needs to be charged as a matter of priority.

When the remaining capacity of the battery 212 is lower than the lower limit (S909, YES), the process proceeds to S910. Then, in S910, the CPU 107 determines a communication application for wireless power supply as a communication application to start, from the communication applications registered in the configuration object. Then, after the process of S910, the CPU 107 terminates the start application determining process (S707).

On the other hand, when the remaining capacity of the battery 212 is greater than the lower limit (S909, NO), the process proceeds to S911. Then, in S911, the CPU 107 obtains information related to the remaining battery capacity needed to complete each communication application written in the configuration object.

Next, in S912, the CPU 107 compares the obtained information related to the remaining battery capacity needed to complete each communication application with the value of the current remaining capacity of the battery 212 in the electronic device 200. Then, a communication application that requires less remaining battery capacity to complete compared to the current remaining capacity of the battery 212 is determined as a communication application to execute. When there is more than one communication application that requires less remaining battery capacity to complete than the current remaining capacity of the battery 212, it is determined that the communication applications are started in order of the registration in the configuration object. Then, after the process of S912, the CPU 107 terminates the start application determining process (S707).

As described above, the power supply apparatus 100 considers the power status of the electronic device 200 and this helps to avoid a problem that the remaining capacity of the battery 212 in the electronic device 200 becomes too low during execution of a communication application and the execution of the communication application is not completed. In contrast, when the remaining capacity of the battery 212 is high, another application is executed before the process of the wireless power supply that takes time and this helps to promptly complete the another application.

[Third Embodiment]

In a third embodiment, in the configuration object created by the electronic device 200, communication applications to be stored is determined according to a condition of a storage medium 219a attached to the electronic device 200. Hereinafter, the third embodiment will be explained in detail with reference to the drawings. Since a block configuration of a power supply apparatus 100 configuring a communication system according to the third embodiment is similar to the configuration illustrated in FIGS. 2 and 3 in the first embodiment, the explanation thereof will be omitted. Further, since a block configuration of an electronic device 200 configuring the communication system according to the third embodiment is similar to the configuration illustrated in FIG. 4 in the first embodiment, the explanation thereof will be omitted. Further, since processes in the power supply apparatus 100 according to the third embodiment are similar to those of FIG. 7 explained in the first embodiment, the explanation thereof will be omitted. Hereinafter, a detailed process in the electronic device 200 will be explained.

(Process in Electronic Device 200)

Since all the basic process procedures in the electronic device 200 according to the third embodiment are same as the flow of S501 to S509 of FIG. 5 of the first embodiment, the explanation thereof will be omitted. The process that differs in the first embodiment and the third embodiment is the content of a process to create a configuration object (S503). According to the first embodiment, the configuration object is created in the procedure illustrated in FIG. 6; however, a different procedure is employed in the third embodiment and the procedure will be explained with reference to FIG. 10.

Figure 10:
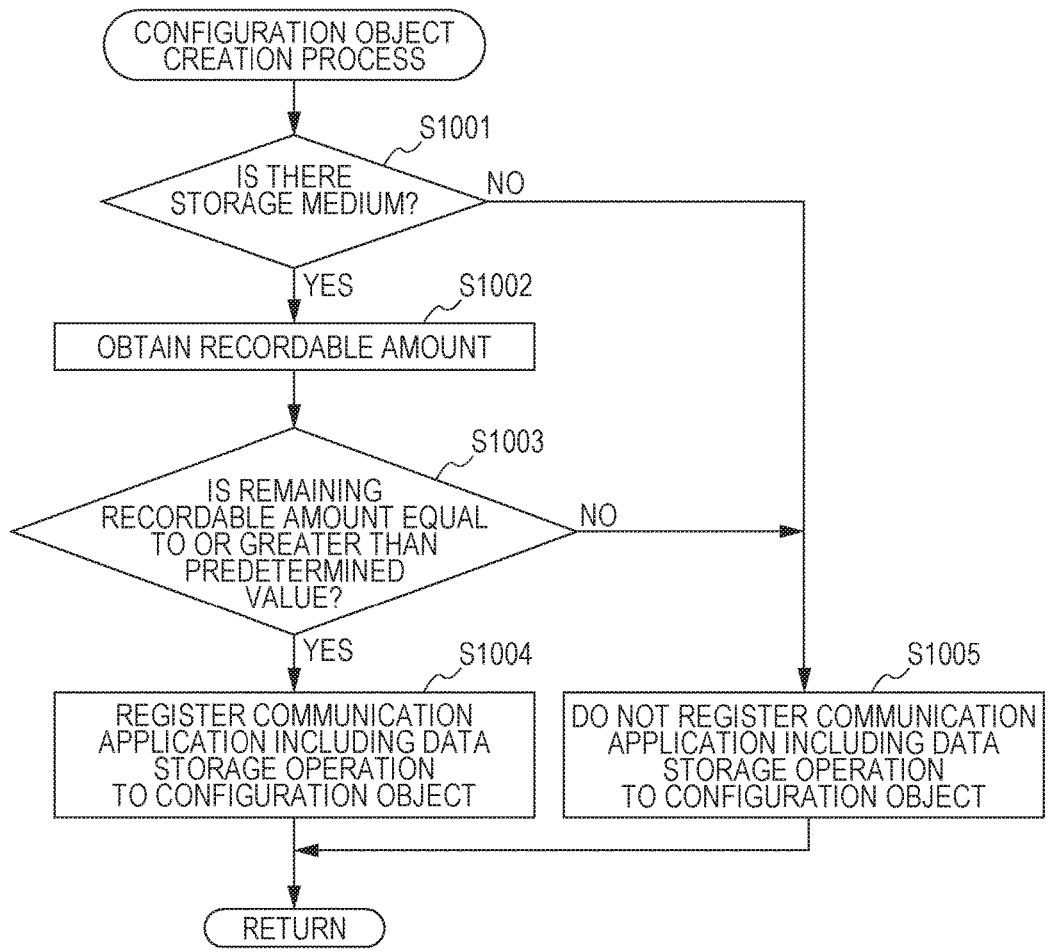
FIG. 10 is a flowchart for explaining a detailed process procedure of creating a configuration object according to a third embodiment.

FIG. 10 is a flowchart for explaining a detailed process procedure of the configuration object creation process of S503 according to the third embodiment.

When the configuration object creation process (S503) is started, in S1001, the CPU 206 confirms to storage unit 219 whether or not the storage medium 219a exists.

Then, when the storage medium 219a does not exist (S1001, NO), the process proceeds to S1005. Then, in S1005, the CPU 206 stores the information that excludes information of the communication application which uses the storage medium 219a to the configuration object, from the information, stored in the ROM 207, of all the communication applications included in the electronic device 200. Then, when the creation of the configuration object is completed, the CPU 206 terminates the configuration object creation process (S503).

On the other hand, when the storage medium 219a exists (S1001, YES), the process proceeds to S1002. Then, in S1002, the CPU 206 controls the storage unit 219 and obtains information related to a free space in the storage medium 219a.

Next, S1003, the CPU 206 compares whether the obtained free space in the storage medium 219a is greater than a predetermined amount. When the obtained free space in the storage medium 219a is greater than the predetermined amount (S1003, YES), the process proceeds to S1004. Then, in S1004, the CPU 206 stores the information, stored in the ROM 207, of all the communication applications included in the electronic device 200 to the configuration object. The, when the creation of the configuration object is completed, the CPU 206 terminates the configuration object creation process (S503).

On the other hand, when the obtained free space in the storage medium 219a is equal to or smaller than the predetermined amount (S1003, NO), the process proceeds to S1005. Then, in S1005, the CPU 206 stores the information that excludes the information of communication application that uses the storage medium 219a to the configuration object, from the information, stored in the ROM 207, of all the communication applications included in the electronic device 200. Then, when the creation of the configuration object is completed, the CPU 206 terminates the configuration object creation process (S503).

As described above, the electronic device 200 determines a communication application to be registered in the configuration object based on a recordable amount of the attached storage medium 219a. This configuration can prevent execution of a communication application that requires data storage to the storage medium 219a when the storage medium 219a does not exist or there is little recordable area, or the like. Thereby, an application error such as a data write error can be prevented.

(Other Embodiments)

The power supply apparatus according to the present invention is not limited to the power supply apparatus 100 explained in the first to third embodiments. Further, the electronic device according to the present invention is not limited to the electronic device 200 explained in the first to third embodiments either. For example, the power supply apparatus and the electronic device according to the present invention may be realized by a system composed of a plurality of devices.

The present invention may be realized by a process that a program that realizes one or more functions of the above embodiments is supplied to a system or a device via a network or a storage medium and one or more processors in a computer in the system or the device read and execute the program. Further, the present invention may be realized by a circuit (ASIC, for example) that realizes one or more functions.

Other Embodiments

Embodiment(s) of the present invention can also be realized by a computer of a system or apparatus that reads out and executes computer executable instructions (e.g., one or more programs) stored on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-213183, filed Oct. 29, 2015, which is hereby incorporated by reference herein in its entirety.

What is claimed is:

1. An electronic device comprising:
   an antenna:
   a proximity wireless communication unit configured to communicate with an external device via the antenna through proximity wireless communication using power wirelessly received from the external device;
   a storage unit;
   a battery: and
   one or more processors configured to control execution of a plurality of application processes including a process for implementing a function executed without power consumption of the battery and a process for implementing a function executed with power consumption of the battery,
   wherein the one or more processors store, into the storage, information regarding the function executed without power consumption of the battery in a case where the one or more processors determine that remaining power of the battery is equal to or smaller than a predetermined amount, and store, into the storage, information regarding the function executed with power consumption of the battery in a case where the one or more processors determine that remaining power of the battery is enough,
   wherein the proximity wireless communication unit transmits, to the external device, the information regarding the function executed without power consumption of the battery in a case where the proximity wireless communication with the external device is established in a state in which the information regarding the function executed without power consumption of the battery is stored in the storage, and
   wherein the proximity wireless communication unit transmits, to the external device, the information regarding the function executed with power consumption of the battery in a case where the proximity wireless communication with the external device is established in a state in which the information regarding the function executed with power consumption of the battery is stored in the storage;
   wherein the one or more processors compare power that is necessary for completing the function executed with power consumption of the battery with the remaining power of the battery, and store, into the storage, the information regarding the function executed with power consumption of the battery in a case where it is possible to complete said function.

2. The electronic device according to claim 1, further comprising
   a connecting unit configured to get connected to an external power source;
   wherein the one or more processors store, into the storage, the information regarding the function executed with power consumption of the battery irrespective of the remaining power of the battery in a case where there is power supply from the external power source, and
   wherein the proximity wireless communication unit transmits, to the external device, the information regarding the function executed with power consumption of the battery in a case where the proximity wireless communication with the external device is established in a state in which the information regarding the function executed with power consumption of the battery is stored in the storage and in addition there is power supply from the external power source.

3. The electronic device according to claim 1, wherein the process for implementing the function executed without power consumption of the battery includes a process for charging the battery.

4. The electronic device according to claim 1, further comprising
   a wireless communication unit configured to perform communication at a distance longer than the proximity wireless communication unit,
   wherein the process for implementing the function executed with power consumption of the battery includes a communication application process for controlling communication with the external device via the wireless communication unit.

5. A control method of an electronic device that includes a proximity wireless communication unit configured to communicate with an external device through proximity wireless communication using power wirelessly received from the external device, a storage, a battery, and one or more processors configured to control execution of a plurality of application processes including a process for implementing a function executed without power consumption of the battery and a process for implementing a function executed with power consumption of the battery, the control method comprising:
   storing, into the storage, information regarding the function executed without power consumption of the battery in a case where remaining power of the battery is equal to or smaller than a predetermined amount:
   storing, into the storage, information regarding the function executed with power consumption of the battery in a case where remaining power of the battery is enough;

implementing, by the one or more processors, the function executed without power consumption of the battery in a case where the information regarding the function executed without power consumption of the battery is read by the external device; and implementing, by the one or more processors, the function executed with power consumption of the battery in a case where the information regarding the function executed with power consumption of the battery is read by the external device;

wherein the one or more processors compare power that is necessary for completing the function executed with power consumption of the battery with the remaining power of the battery, and store, into the storage, the information regarding the function executed with power consumption of the battery in a case where it is possible to complete said function.

6. A non-transitory storage medium that stores a program that, when executed, causes an electronic device to perform a control method, the electronic device including a proximity wireless communication unit configured to communicate with an external device through proximity wireless communication using power wirelessly received from the external device, a storage, a battery, and one or more processors configured to control execution of a plurality of application processes including a process for implementing a function executed without power consumption of the battery and a process for implementing a function executed with power consumption of the battery, the control method comprising:

storing, into the storage, information regarding the function executed without power consumption of the battery in a case where remaining power of the battery is equal to or smaller than a predetermined amount:

storing, into the storage, information regarding the function executed with power consumption of the battery in a case where remaining power of the battery is enough:

implementing, by the one or more processors, the function executed without power consumption of the battery in a case where the information regarding the function executed without power consumption of the battery is read by the external device: and wherein the one or more processors compare power that is necessary for completing the function executed with power consumption of the battery with the remaining power of the battery, and store, into the storage, the information regarding the function executed with power consumption of the battery in a case where it is possible to complete said function.

7. The electronic device according to claim 1, wherein the one or more processors compare power that is necessary for completing the function executed with power consumption of the battery with the remaining power of the battery, and store, into the storage, the information regarding the function executed with power consumption of the battery in a case where it is possible to complete said function.

8. The control method according to claim 5, wherein the electronic device has a connecting unit configured to get connected to an external power source, and the control method further comprises:

storing, into the storage, the information regarding the function executed with power consumption of the battery irrespective of the remaining power of the battery in a case where there is power supply from the external power source, and implementing, by the one or more processors, the function executed with power consumption of the battery in a case where the information regarding the function executed with power consumption of the battery is read by the external device in a state in which there is power supply from the external power source.

9. The control method according to claim 5, wherein the process for implementing the function executed without power consumption of the battery includes a process for charging the battery.

10. The control method according to claim 5, wherein the electronic device has a wireless communication unit configured to perform communication at a distance longer than the proximity wireless communication unit, and wherein the process for implementing the function executed with power consumption of the battery includes a communication application process for controlling communication with the external device via the wireless communication unit.

11. The control method according to claim 5, wherein power that is necessary for completing the function executed with power consumption of the battery is compared with the remaining power of the battery, wherein the information regarding the function executed with power consumption of the battery is stored in a case where it is possible to complete said function, and wherein the information regarding the function executed with power consumption of the battery is not stored in a case where it is not possible to complete said function.

* * * * *